UNITED STATES PATENT OFFICE.

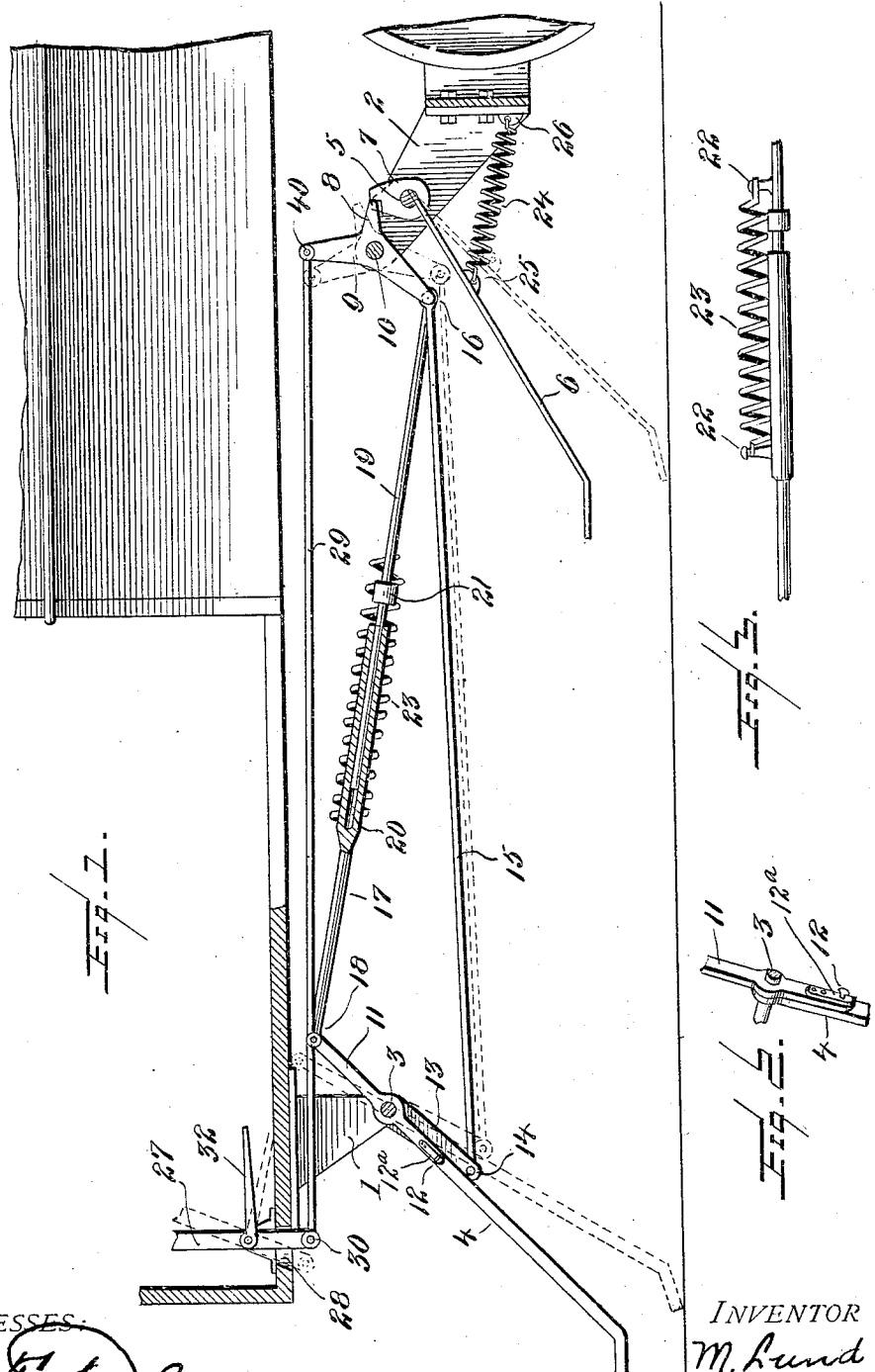

MATTHEW LUND, OF GRAND RAPIDS, MICHIGAN, ASSIGNOR OF ONE-HALF TO GEORGE K. McMULLEN, OF GRAND RAPIDS, MICHIGAN.

STREET-CAR FENDER.

No. 875,541.           Specification of Letters Patent.           Patented Dec. 31, 1907.

Application filed March 28, 1907. Serial No. 364,989.

*To all whom it may concern:*

Be it known that MATTHEW LUND, a citizen of the United States, residing at Grand Rapids, in the county of Kent and State of Michigan, has invented certain new and useful Improvements in Street-Car Fenders, of which the following is a specification.

This invention relates to new and useful improvements in fenders for street cars and it has particular reference to a fender of the scoop type including a main fender projecting from the front of the car, and an auxiliary fender or wheel guard.

In connection with a fender of this type, the invention aims as a primary object to provide a pivoted front fender adapted to be tripped in either direction and to simultaneously actuate means to permit of the auxiliary fender being moved to a position where its edge rests upon the road bed.

The detailed construction will appear in the course of the following description in which reference is had to the accompanying drawings forming a part of this specification, like characters of reference designating similar parts throughout the several views, wherein:

Figure 1 is a side elevation with parts shown in section, of a fender constructed in accordance with my invention. Fig. 2 is a detailed perspective view of a connection between the front fender and its tripping lever or rod, and Fig. 3 is a top plan view illustrating a rod connection to be hereinafter specifically referred to.

Referring specifically to the accompanying drawings the numeral 1 designates a bracket suspended from the front of the car, and the numeral 2 a forwardly extending bracket provided on the front truck. The brackets 1 and 2 constitute supports for the movable elements of the invention. Instead of single brackets 1 and 2, said brackets may be arranged in pairs if so desired. In the bracket 1 a rock shaft is journaled upon which is fixed the main fender 4, which is of the scoop type. A rock shaft 5 is journaled in the bracket or brackets 2, and carries the auxiliary fender or wheel guard 6. Shaft 5 carries a fixed stop 7, which is engaged by a projecting arm 8 of a two-armed lever 9, pivoted at a central point upon a shaft 10, said shaft being journaled in the bracket 2.

There is mounted upon the shaft 3 an upwardly extending lever 11, which is alined with the fender 4, and which is fixed with relation thereto by pin 12, detachably engaging the side of said fender, and carried by a leaf spring $12^a$. An arm 13 is loosely mounted upon the shaft 3 and is suspended therefrom. The arm 13 works between the slats of the fender 4, and has at its lower end a pin 14 designed to be engaged by the side of said fender. The pin 14 is extended to afford a pivot for a rod 15 which connects the arm 13 with the lower end of the lever 9, the arm 15 being pivotally connected to said lower end as at 16. The lever 11 is likewise connected with the lower end of the lever 9 by a rod comprising a section 17, pivoted as at 18 to said lever 11, and a rod 19 pivoted to the lower end of the lever 9, the pivot 16 serving as a common pivot for the rod 15 and the section 19. The section 17 has an enlarged end provided with an elongated axial recess 20, within which the outer portion of the section 19 is movably received. Said section is provided with a fixed stop 21, which is designed to limit its movement with respect to the section 17, by engaging the end thereof. The sections 17 and 19 are provided with pins 22, between which a coil retractile spring 23 is imposed.

A coil spring 24 is employed for engaging the fender 6 with the road bed, and has its ends connected to a lug 25 provided on said fender, and to a lug 26 provided at the rear portion of the bracket 2.

Means are provided for actuating the fenders in synchronism from the front of the car, such means comprising a pivoted lever 27 provided upon the car platform, and projecting through an opening 28 in the floor of the car, and a rod 29, pivoted as at 30 to the lower end of the lever 27, and as at 40, to the upper end of the lever 9. The lever 27 carries an arm 32, which engages the floor of the car as a stop and limits the movement of said lever, as is shown in dotted lines in Fig. 1.

In operation, a large obstacle on the track will impinge the fender 4 and depress the same to the dotted line position of Fig. 1. In this actuation the fender 4 will engage the pin 14 of the arm 13, and move said arm rearwardly. This action of the arm 13 will be transmitted, through the rod 15 to the lever 9, and will rock said lever so that the arm 8 disengages the stop 5, at which time the spring 24 will act to trip the fender 6 to the dotted line position. On the other hand, assuming that the obstacle is too small to engage the fender as a scoop, but is sufficiently large to pass underneath the same with a wedging action, the fender 4 will be raised, and in such action will actuate the lever 9 by means of the sections 17 and 19, with a result the same as above described. When the rod 15 actuates the lever 9, it will of course be understood that the sections 17 and 19 are moved outwardly against the tension of the spring 23. When the lever 9 is actuated by means of the sections 17 and 19, the arm being loosely mounted on the shaft 3 will yield, as will be readily understood. It will of course be apparent that the spring 23 serves to balance the connected parts. When the fender is to be operated from the car, the lever 27 is swung rearwardly on its pivot and in such actuation moves the rod 29 forwardly to swing the lever 9 and disengage the arm 8 from the stop 5. It is sometimes desired to support the fender 4 in a raised position. In such cases the pin 12 is disengaged from said fender to permit of the same being raised without an actuation of the parts.

While the elements herein shown and described are well adapted to serve the functions for which they are intended, it is obvious that various minor changes may be made in the proportion, shape and arrangement of the several parts without departing from the spirit and scope of my invention, as defined in the appended claims.

Having fully described my invention, I claim:

1. A device of the type set forth, comprising a pivoted main fender, a pivoted auxiliary fender, means for supporting said auxiliary fender in a raised position, and means controlled by said main fender in its movement in either direction for releasing said auxiliary fender.

2. A device of the type set forth comprising a rock shaft, a main fender carried thereby, a lever fixed to said main fender, an arm loosely carried by said shaft, a second rock shaft, a fender carried thereby, a stop carried thereby, a pivoted lever having an arm for engaging with said stop to hold said last named fender in a raised position, said last named lever having upper and lower portions on each side of its pivot, a rod interposed between said arm and the lower end of said lever, and being pivoted thereto, a second rod comprising relatively movable interfitting sections, one of said sections being pivoted to the end of said first named lever, and the other of said sections being pivoted to the lower end of said last named lever, a retractile coil spring interposed between said sections, and a coil spring for actuating said last-named fender to move the same downwardly.

3. A device of the type set forth, comprising a pivoted main fender, a pivoted auxiliary fender, means for supporting said auxiliary fender in a raised position, means controlled by said main fender in its movement in either direction, for disengaging said last named means, and means controlled manually from the car for disengaging said last named means.

In testimony whereof, I have affixed my signature in presence of two witnesses.

MATTHEW LUND.

Witnesses:
E. D. WILLIAMS,
S. OWEN LIVINGSTON.